United States Patent

[11] 3,622,480

| [72] | Inventors | Everett R. Johnson<br>Chevy Chase, Md.;<br>Edwin N. Ladov, Maple Shade, N.J.; Earl<br>W. Holtzscheiter, Jr., College Park, Md. |
|---|---|---|
| [21] | Appl. No. | 874,030 |
| [22] | Filed | Nov. 4, 1969 |
| [45] | Patented | Nov. 23, 1971 |
| [73] | Assignee | The United States of America as represented by the United States Atomic Energy Commission |

[54] METHOD OF INCREASING THE CONCENTRATION OF OYXGEN-18 IN AN OXYGEN-CONTAINING COMPOUND
3 Claims, No Drawings

[52] U.S. Cl.......................................................... 204/157.1
[51] Int. Cl............................................................ B01j 1/10
[50] Field of Search............................................ 204/157.1 H

[56] References Cited
OTHER REFERENCES
Cunningham, Jour. Phy. Chem. 65 (1961) pp. 628–635.

*Primary Examiner*—Howard S. Williams
*Attorney*—Roland A. Anderson

ABSTRACT: A method of producing oxygen-18 enriched compounds comprising irradiating a compound containing an oxyganion with high energy radiation in the presence of a gas containing oxygen-18.

METHOD OF INCREASING THE CONCENTRATION OF OYXGEN-18 IN AN OXYGEN-CONTAINING COMPOUND

BACKGROUND OF THE INVENTION

This invention was made in the course of, or under, a contract with the United States Atomic Energy Commission.

Our invention relates to methods of increasing the concentration of oxygen-18 in an oxygen-containing compound.

Methods of producing compounds enriched in oxygen-18 are known. For instance, oxygen-18 enriched $KNO_3$ is usually prepared by exchange of oxygen-18 enriched $H_2O$ and $HNO_3$ followed by neutralization with KOH. The resulting oxygen-18 enriched $KNO_3$ can be further enriched in oxygen-18 by dissolving it in $^{18}O$ enriched water acidified with $HNO_3$. By using water of 90 atom percent $^{18}O$ enrichment $KNO_3$ containing 42.6 atom percent $^{18}O$ has been produced in the first step and 84.2 atom percent $^{18}O$ in the second. However, this process has several disadvantages. First, the neutralization step requires the use of KOH which results in isotopic dilution. Secondly, this process requires a substantial investment in $H_2^{18}O$, some of which is lost during the exchange. Thirdly, the process is cumbersome, involving a variety of different steps.

SUMMARY OF THE INVENTION

It is accordingly one object of our invention to provide an improved process for producing oxygen-18 enriched compounds.

Other objects of our invention will become apparent from the following description and the attached claims.

We have discovered that radiation induces an exchange between the oxygen in an oxygen-containing anion and in an oxygen-containing gas in contact therewith, and in accordance with our discovery we have provided a method of producing oxygen-18 enriched compounds comprising irradiating an oxygen-containing anion (an oxyanion) in the presence of a gas containing oxygen-18.

Our process produces oxygen-18 enriched compounds more cheaply than prior art methods with fewer steps, and our process is compatible with other isotope enrichment methods which may be used with our process to minimize losses of isotopically enriched compounds. Furthermore, with oxyanions containing more than one atom of oxygen, a portion of the product will have more than one atom of oxygen-18. For instance, with nitrate, a product comprising a mixture of nitrates containing one, two, and three atoms of oxygen-18 is produced.

DESCRIPTION OF THE INVENTION

In carrying out our invention an oxyanion is irradiated in the presence of oxygen-18 enriched gas, thereby becoming enriched in oxygen-18.

Any oxygen-containing anion such as nitrate, chlorate, perchlorate, iodate, bromate, phosphate and carbonate may be used. For convenience, details of our invention will be described with respect to nitrate.

The concentration of oxygen-18 in the gas must be greater than the equilibrium concentration under the irradiation conditions. For efficiency in the exchange reaction and to obtain as great a concentration change in one step as possible the oxygen-18 concentration in the gas should be greater than 1 percent and is preferably greater than 30 percent.

The radiation source may be either a beta or a gamma emitter.

The temperature at which the irradiation is carried out is not critical and may suitably range from $-198°$ C. up to the melting temperature of the oxyanion.

The extent of irradiation is not critical and depends on the degree of enrichment desired since the enrichment increases with dosage until equilibrium is reached. If $KNO_3$ containing a normal isotopic concentration of oxygen-18 is irradiated in the presence of 98 percent oxygen-18 gas to an absorbed dose of 1,100 megarads the resulting $KNO_3$ will be about 20 atom percent enriched in oxygen-18.

Under irradiation $KNO_3$ decomposes into $KNO_2$ and oxygen in accordance with the equation.

$$KNO_3 \rightarrow KNO_2 + \tfrac{1}{2}O_2$$

Consequently the gas originally containing 98 percent oxygen-18 is isotopically diluted by the exchange between $^{18}O$ in the gas and $^{16}O$ in the $KNO_3$ and by the addition of $^{16}O$ from the above decomposition reaction. However, the isotopically diluted $^{18}O$ in the gaseous phase may be productively utilized by employing it as an oxidant in an oxidizing reaction. For example, the potassium nitrite produced by the irradiation of $KNO_3$ can be reoxidized to the nitrate.

EXAMPLE

One gram of $KNO_3$ having a normal oxygen isotopic concentration of 0.204 percent $^{18}O$ is irradiated with gammas from a cobalt-60 source to a level of 1,100 megarads in the presence of 100 milliliters at a pressure of one atmosphere of a gas containing 98 percent oxygen-18. At this irradiation level about 20 mole percent of the oxygen is exchanged. The reaction products are $KNO_3$ enriched in oxygen-18 to 20 mole percent; $KNO_2$ enriched in oxygen-18 to about 5 mole percent, and gaseous oxygen containing 33 percent oxygen-18.

The mixtures of $KNO_3$ and $KNO_2$, both enriched in oxygen-18 are separated by fractional crystallization. The separated $KNO_2$ is oxidized with the gaseous oxygen containing 33 percent oxygen-18, thus producing $KNO_3$ which has a final enrichment in oxygen-18 of about 38 percent.

What is claimed is:

1. A method of increasing the concentration of oxygen-18 in a compound containing an oxyanion comprising irradiating said compound with high energy radiation in the presence of gaseous oxygen containing oxygen-18.

2. The method of claim 1 wherein said oxyanion is selected from the group consisting of nitrate, bromate, chlorate, iodate, phosphate, carbonate, and perchlorate.

3. The method of claim 1 wherein said compound is potassium nitrate, a mixture of $KNO_3$ and $KNO_2$ is formed from said irradiation, and said $KNO_2$ is oxidized to $KNO_3$ with the oxygen-containing gaseous mixture formed from said irradiation.

* * * * *